(12) United States Patent
Kim et al.

(10) Patent No.: US 10,865,876 B2
(45) Date of Patent: Dec. 15, 2020

(54) SHIFT LEVER APPARATUS FOR VEHICLE

(71) Applicants: Hyundai Motor Company, Seoul (KR); Kia Motors Corporation, Seoul (KR); Kyung Chang Industrial Co., Ltd., Daegu (KR)

(72) Inventors: Yong Ik Kim, Hanam-si (KR); Bum Jun Kim, Siheung-si (KR); Sun Il Kim, Hwaseong-si (KR); Ji Soo Kim, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 9 days.

(21) Appl. No.: 16/544,119

(22) Filed: Aug. 19, 2019

(65) Prior Publication Data

US 2020/0355258 A1 Nov. 12, 2020

(30) Foreign Application Priority Data

May 8, 2019 (KR) .................. 10-2019-0053765

(51) Int. Cl.
*B60K 20/00* (2006.01)
*G05G 9/00* (2006.01)
*F16H 59/10* (2006.01)
*F16H 59/02* (2006.01)

(52) U.S. Cl.
CPC ......... *F16H 59/10* (2013.01); *F16H 59/0204* (2013.01); *F16H 59/0278* (2013.01)

(58) Field of Classification Search
CPC .... F16H 59/105; F16H 59/0204; F16H 59/10; F16H 59/0278; H01H 2300/02
See application file for complete search history.

(56) References Cited

U.S. PATENT DOCUMENTS

| 5,949,344 A * | 9/1999 | Yasuda | ................. F16H 59/105 180/336 |
| 6,393,932 B1 * | 5/2002 | Seki | ........................ F16H 59/10 74/335 |
| 2016/0348782 A1 * | 12/2016 | Won | ...................... F16H 59/105 |

FOREIGN PATENT DOCUMENTS

KR  10-0510351 B1  8/2005

* cited by examiner

*Primary Examiner* — Jake Cook
(74) *Attorney, Agent, or Firm* — Morgan, Lewis & Bockius LLP

(57) ABSTRACT

A shift lever apparatus for a vehicle is an apparatus, in which by integrating P-range switch function into manual switch function, components for the P-range switch are eliminated and thus the configuration is simplified and cost reduction is achieved.

10 Claims, 12 Drawing Sheets

SHIFT LEVER APPARATUS FOR VEHICLE

CROSS REFERENCE TO RELATED APPLICATION

The present application claims priority to Korean Patent Application No. 10-2019-0053765, filed May 8, 2019, the entire contents of which is incorporated herein for all purposes by this reference.

BACKGROUND OF THE INVENTION

Field of the Invention

The present invention relates to a shift lever apparatus for a vehicle. More particularly, the present invention relates to a shift lever apparatus for a vehicle, in which the configuration of a transmission lever is simplified and cost reduction is achieved by integrating P-range switch function into manual switch function.

Description of Related Art

In a conventional automatic transmission vehicle, P, R, N, and D ranges are usually linearly disposed, and a shift lever is rotated to select any one of a plurality of ranges. When the shift lever is rotated, a cable is pulled and the operating force thereof is transmitted to a transmission.

In other words, since the point at which the cable is connected to the shift lever is a position which is spaced upwards from the rotation center of the shift lever, when the shift lever is rotated, the cable is pulled or loosened according to the rotation angle of the shift lever, and the operating force is transmitted to the transmission, whereby the shifting of the gear stages is performed by recognizing the operating force.

Meanwhile, a shift lever apparatus is provided with an M range, which is a manual mode, in addition to the P, R, N, and D ranges, and is configured such that a shift lever is moved in a direction perpendicular to a direction of the line formed by the P, R, N, and D ranges to select the manual mode. In the manual mode, the operation of the shift lever in + and − directions is detected as a signal by a sensor and is transmitted to the transmission.

Meanwhile, when shifting to the P range of the P, R, N, D ranges, instead of simply operating the shift lever, a P position switch is operated. The P position switch, which is for detecting the P-range shift intention of a driver, may be provided to a transmission lever or may be separately provided so that shifting to the P range may be performed depending on whether the driver intends to shift to the P range or not.

The shift lever apparatus configured as described above is necessarily provided with a sensor switch for detecting + and − positions of the shift lever in the manual mode, and a position switch for determining the P range is separately configured, so that the manufacturing cost is increased and the work process is also increased.

Therefore, a new way is required to reduce cost while maintaining is configured to detect the shift position in the manual mode and to detect the shift intention to the P range.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift lever apparatus for a vehicle, in which the configuration of a transmission lever is simplified and cost reduction is achieved by integrating P-range switch function into manual switch function.

In various aspects of the present invention, there is provided a shift lever apparatus for a vehicle, the apparatus including: a shift lever configured to select an automatic mode when being rotated in a first direction and select a manual mode when being rotated in a second direction according to operation of a transmission lever; an engaging lever coupled to the shift lever and configured to be moved along with the shift lever when the shift lever is operated to select the automatic mode, and to be separated from the shift lever when the shift lever is operated to select the manual mode; an auxiliary lever connected to the shift lever to be moved along with the shift lever in the forward and backward directions; a switching lever provided within a rotation radius of the auxiliary lever, configured to be moved by the auxiliary lever when the shift lever is operated to select P range of shift ranges of the automatic mode and to be connected to the shift lever and moved along with the shift lever when the shift lever is operated to select the manual mode, and provided with a brush portion; and a substrate provided with a plurality of terminal portions having a P-range terminal, a + position terminal, and a − position terminal according to the manual mode for detecting a rotational position of the switching lever, and configured to be electrically connected to generate a signal when the switching lever is rotated and the brush portion is positioned at a predetermined terminal portion, allowing a shift range to be switched.

The auxiliary lever may be provided with a rotation shaft; the shift lever may be coupled to the rotation shaft through an auxiliary pin penetrating through the rotation shaft to be rotated along with the auxiliary lever in the first direction or to be rotatable in the left and right direction via the auxiliary pin; and the engaging lever may be connected to the shift lever while being provided to be rotatable relative to the rotation shaft, and may be configured to be rotated along with the shift lever about the rotation shaft when the shift lever is operated to select the automatic mode, and not to be rotated by being separated from the shift lever when the shift lever is operated to select the manual mode.

The apparatus may further include a transmission module casing in which the switching lever is rotatably mounted, the substrate is accommodated, and a switching mechanism being moved upward and downward when the shift lever is moved in the second direction is provided, wherein the plurality of terminal portions of the substrate further includes a mode conversion terminal which is electrically connected to the switching mechanism to allow switching to the manual mode when the switching mechanism is moved upward and downward as the shift lever is moved in the second direction thereof.

The switching lever may be provided with a stop portion which is rotatably provided in the transmission module casing and protrudes toward the shift lever through the transmission module casing, and the transmission module casing may be provided with a guide hole receiving a rotation radius of the stop portion.

The shift lever may be formed with a stop groove in a surface thereof facing the transmission module casing such that the stop portion is inserted into the stop groove when the shift lever is operated to select the manual mode.

The switching mechanism may include: a rotating bar rotatably connected to the transmission module casing to perform seesaw movement, and configured such that a first end portion thereof is connected to the shift lever through the transmission module casing and a second end portion thereof is positioned in the transmission module casing; and a movable portion coupled to the second end portion of the rotating bar, moved linearly in conjunction with rotation of the rotating bar, and provided with an electrical connection portion to be electrically connected to the mode conversion terminal when the electrical connection portion enters the mode conversion terminal, allowing switching to be performed to the manual mode.

The plurality of terminal portions of the substrate may further include a first ground terminal spaced from the mode conversion terminal, with the electrical connection portion of the movable portion being always electrically connected to the first ground terminal.

The transmission module casing may be formed with a slit hole through which the rotating bar penetrates, and a guide portion extending from the slit hole toward the mode conversion terminal to guide linear movement of the movable portion.

The plurality of terminal portions of the substrate may further include a second ground terminal in which the P-range terminal, the + position terminal, and the − position terminal are disposed along a rotation radius of the switching lever while being spaced from each other, with the brush portion of the switching lever being always electrically connected to the second ground terminal.

According to the shift lever apparatus configured for a vehicle configured as described above, by integrating P-range switch function into manual switch function, components for the P-range switch are eliminated, so that the configuration is simplified and cost reduction is achieved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
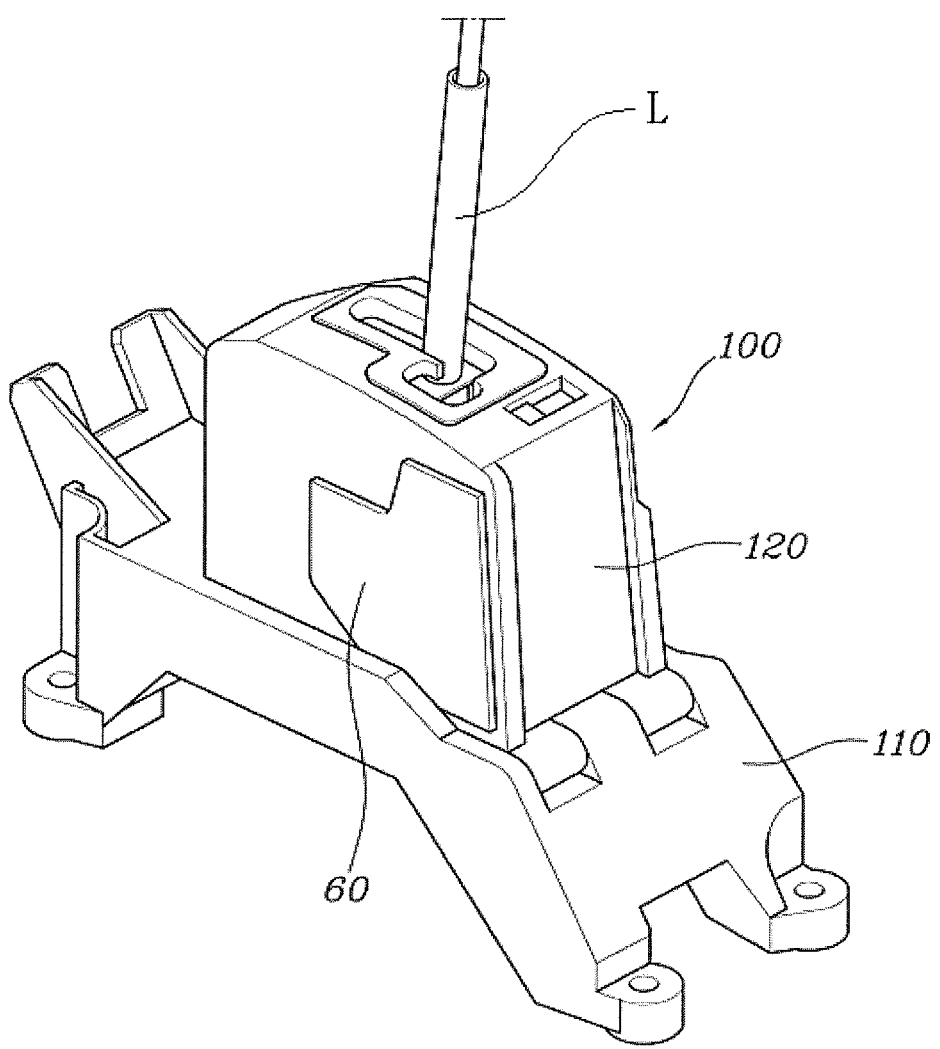
FIG. 1 is a view showing a shift lever apparatus for a vehicle according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, a shift lever apparatus for a vehicle according to an exemplary embodiment of the present invention will be described in detail with reference to the accompanying drawings.

Figure 2:
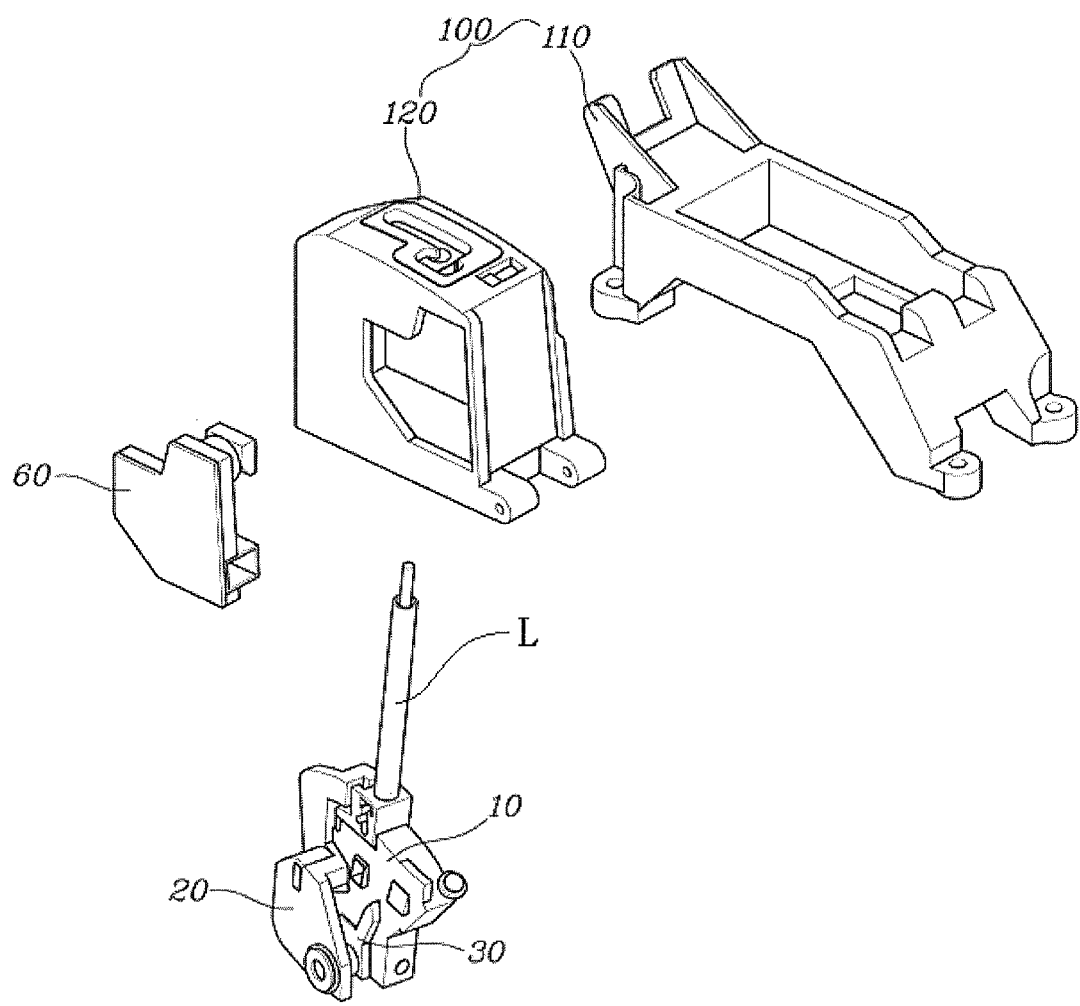
FIG. 2 is an assembled view of the shift lever apparatus for a vehicle shown in FIG. 1, FIG. 3, FIG. 4, FIG. 5, FIG. 6, FIG. 7, FIG. 8, and FIG. 9 are views illustrating the shift lever apparatus for a vehicle shown in FIG. 1, and FIG. 10, FIG. 11, and FIG. 12 are views illustrating operation of the shift lever apparatus for a vehicle shown in FIG. 1.

FIG. 1 is a view showing a shift lever apparatus for a vehicle according to an exemplary embodiment of the present invention, FIG. 2 is an assembled view of the shift lever apparatus for a vehicle shown in FIG. 1, FIG. 3, FIG. 4, FIG. 5, FIG. 6, FIG. 7, FIG. 8, and FIG. 9 are views illustrating the shift lever apparatus for a vehicle shown in FIG. 1, and FIG. 10, FIG. 11, and FIG. 12 are views illustrating operation of the shift lever apparatus for a vehicle shown in FIG. 1.

Figure 3:
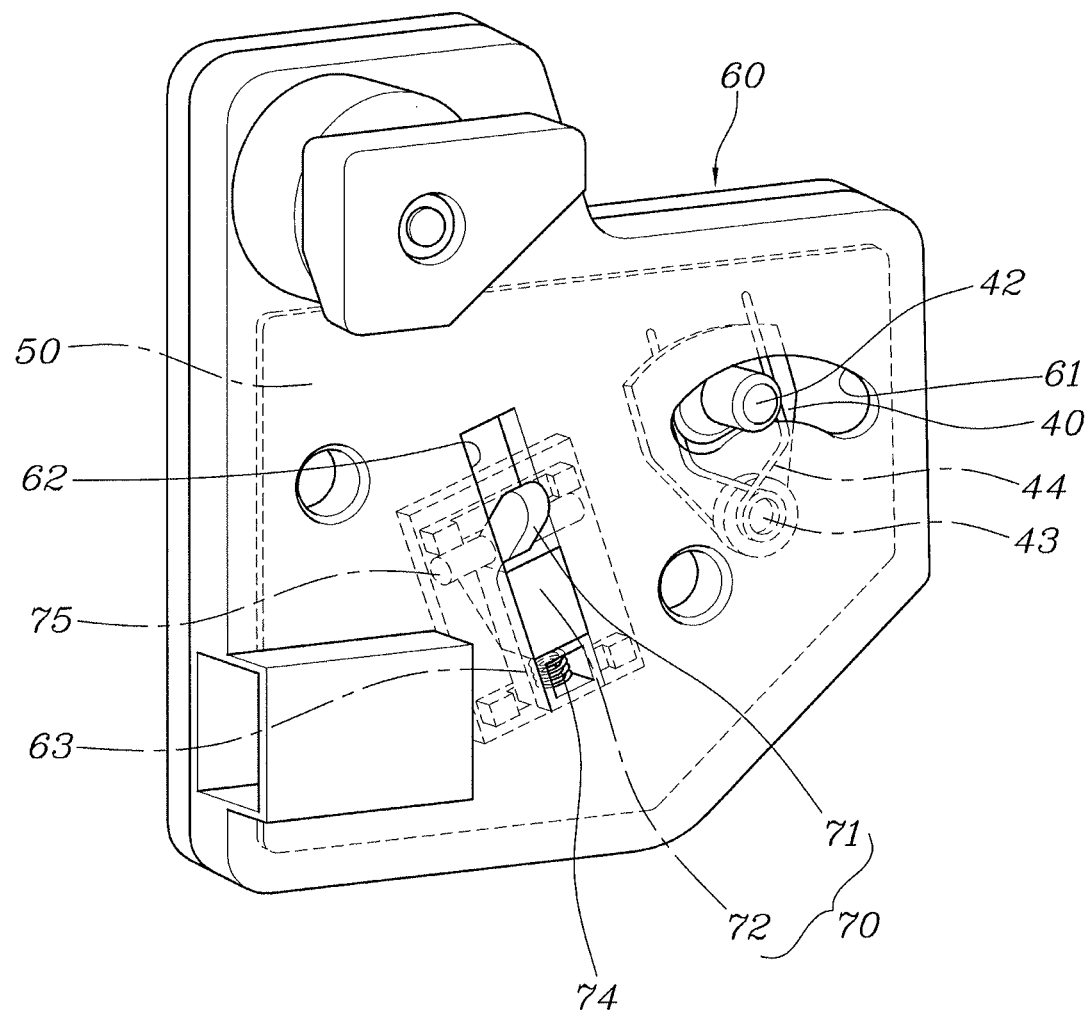

As shown in FIG. 1, FIG. 2, and FIG. 3, the shift lever apparatus for a vehicle according to an exemplary embodiment of the present invention may include a shift lever 10 configured to select an automatic mode when being rotated in a forward and backward directions, and select a manual mode when being rotated in a left and right direction according to operation of a transmission lever L; an engaging lever 20 configured to be connected to the shift lever 10 and be moved along with the shift lever 10 when the shift lever 10 is configured to select the automatic mode, and to be separated from the shift lever 10 when the shift lever 10 is configured to select the manual mode; an auxiliary lever 30 connected to the shift lever 10 to be moved along with the shift lever 10 in the forward and backward directions; a switching lever 40 provided within a rotation radius of the auxiliary lever 30, configured to be moved by the auxiliary lever 30 when the shift lever 10 is configured to select P range of shift ranges of the automatic mode and to be connected to the shift lever 10 and moved along with the shift lever 10 when the shift lever 10 is configured to select the manual mode, and provided with a brush portion 41; and a substrate 50 provided with a plurality of terminal portions 51 having a P-range terminal 52, a + position terminal 53, and a − position terminal 54 according to the manual mode for detecting a rotational position of the switching lever 40, and configured to be electrically connected to generate a signal when the switching lever 40 is rotated and the brush portion 41 is positioned at a predetermined terminal portion 51, allowing a shift range to be switched.

In an exemplary embodiment of the present invention, the shift lever 10, the engaging lever 20, and the auxiliary lever 30 may be configured to be a single assembly, or may be provided in a lever casing 100. Herein, the lever casing 100 may be constituted by a lever bracket 110 and a bracket core 120 for being mounted to a vehicle, wherein the shift lever 10, the engaging lever 20, the auxiliary lever 30, the switching lever 40, and the substrate 50 may be provided in the bracket core 120.

The shift lever 10 in an exemplary embodiment of the present invention is configured to select P, R, N, and D ranges, which are the automatic mode, when being rotated in the forward and backward directions, and to select an M range, which is the manual mode, when being rotated in the left and right direction thereof. The shift lever 10 is configured to be capable of selecting the manual mode when the shift lever is rotated in the left and right direction while in the state where the D range of the shift ranges of the automatic mode has been selected, so shifting is performed from the D range, as the drive range, to the manual mode, and the shift range is shifted to the + or − position. Furthermore, the auxiliary lever 30 is coupled to the shift lever 10 to be moved along with the shift lever 10 in the forward and backward directions and is operated in conjunction with the switching lever 40 to be described later.

The engaging lever 20 is provided at a side of the shift lever 10, and is configured to be connected to the shift lever 10 and moved along with shift lever 10 the when the shift lever 10 is in the automatic mode, and to be separated from the shift lever 10 when the shift lever 10 is in the manual mode. The connecting and separating structure of the shift lever 10 and the engaging lever 20 may be selectively connectable or separated by a protrusion and groove structure. In the structure of the shift lever, the connection structure between the shift lever 10 and the engaging lever 20 is known, so that the description thereof is omitted.

Accordingly, the shift lever 10, the engaging lever 20, and the auxiliary lever 30 have a structure in which they are operated together, and the substrate 50 is provided to generate a signal corresponding to a predetermined shift range according to the movement position of the switching lever 40 operated in conjunction with the operating direction of the shift lever 10.

In other words, the switching lever 40 is provided at a side of the shift lever 10 within the rotation radius of the auxiliary lever 30, and is moved by the auxiliary lever 30 when the shift lever 10 is configured to select the P range of the shift ranges of the automatic mode. Accordingly, when the position of the switching lever 40 is moved by the auxiliary lever 30 as the shift lever 10 is configured to select the P range of the shift ranges of the automatic mode, the brush portion 41 provided in the switching lever 40 is brought into contact with the P-range terminal 52 provided in the substrate 50 and is electrically connected thereto, whereby the substrate 50 sends a signal to allow switching to be performed to the P-range shift range.

Meanwhile, when the shift lever 10 is configured to select the manual mode, the switching lever 40 is directly connected to the shift lever 10 and is moved along with the shift lever 10. Thus, when the shift lever 10 is moved to select the + position or the − position in the manual mode, the switching lever 40 is moved along with the shift lever 10, whereby the brush portion 41 provided in the switching lever 40 is brought into contact with the + position terminal 53 or the − position terminal 54 provided in the substrate 50 and is electrically connected thereto. Accordingly, the substrate 50 sends a signal to allow switching to be performed to the + position shift range or the − position shift range according to the manual mode.

As described above, in an exemplary embodiment of the present invention, when the shift lever 10 is rotated in the forward and backward directions, a shift range according to the automatic mode is selected, wherein in the case of the P range, the auxiliary lever 30 rotated along with the shift lever 10 rotates the switching lever 40 such that the brush portion 41 of the switching lever 40 is electrically connected to the P-range terminal 52 provided in the substrate 50, whereby a signal corresponding thereto is transmitted to perform shifting to the P range.

Furthermore, in the case where shifting is performed by switching to the manual mode, when the shift lever 10 is rotated in the left and right direction thereof, the shift lever 10 and the switching lever 40 are directly connected to each other and are rotated together, and the brush portion 41 of the switching lever 40 is electrically connected to the + position terminal 53 or the − position terminal 54 provided in the substrate 50, whereby a signal corresponding thereto is transmitted to perform shifting in the manual mode.

Figure 4:
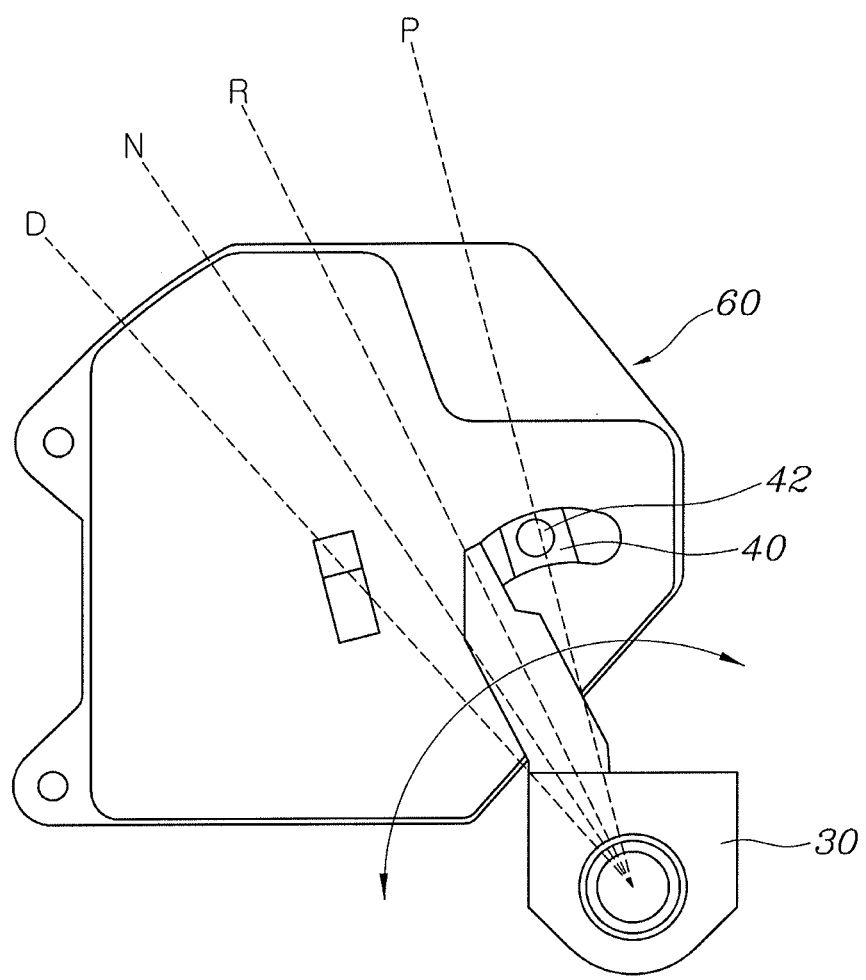
Figure 5:
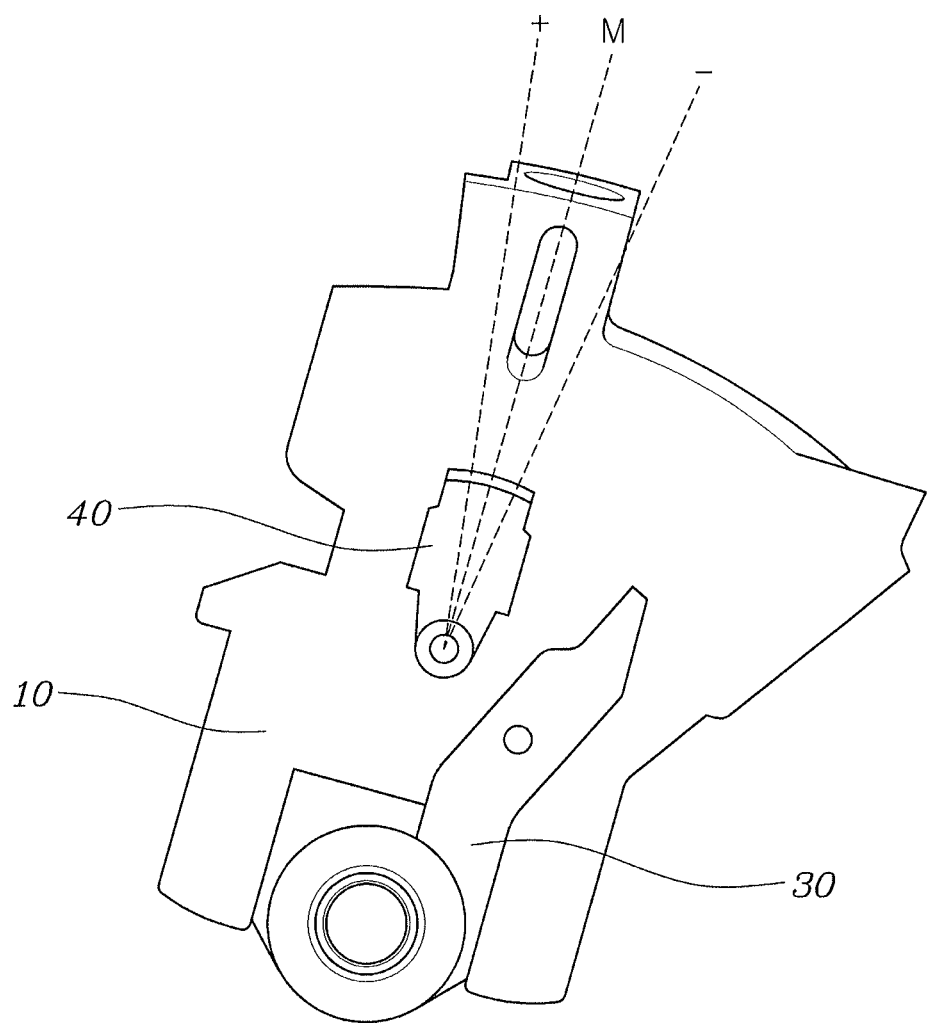
Figure 6:
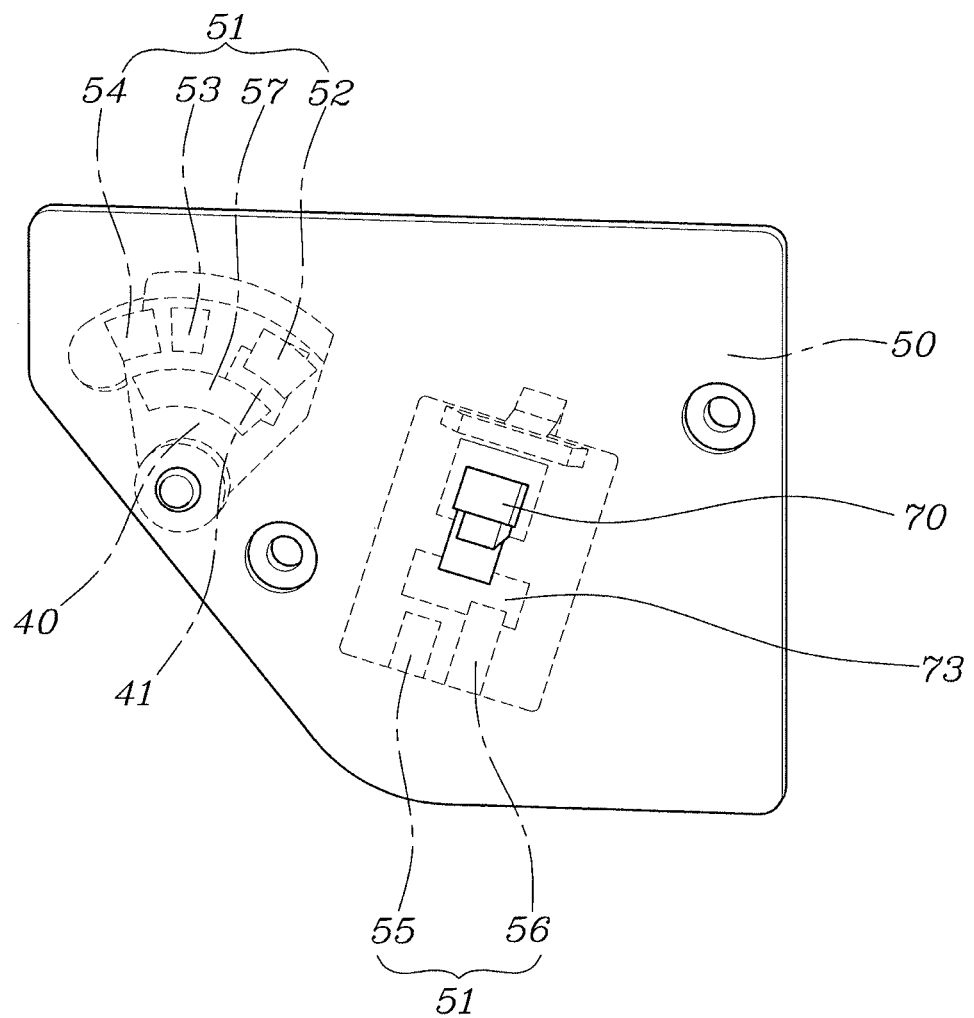

To the present end, as shown in FIG. 4, when shifting is performed to the R, N, and D ranges as the shift lever 10 is rotated, the auxiliary lever 30 is not brought into contact with the switching lever 40; and when shifting is performed to the P range as the shift lever 10 is rotated, the auxiliary lever 30 is brought into contact with the switching lever 40 to rotate the switching lever 40, so that the brush portion 41 of the switching lever 40 can be electrically connected to the P-range terminal 52 of the substrate 50. Furthermore, as shown in FIG. 5, when the shift lever 10 is configured to select the manual mode, the shift lever 10, the auxiliary lever 30, and the switching lever 40 are rotated together, whereby the auxiliary lever 30 is not interfered with by the switching lever 40, and the brush portion 41 of the switching lever 40 can be electrically connected to the + position terminal 53 or the − position terminal 54 of the substrate 50.

Herein, when the shift lever 10 is rotated in the automatic mode, the timing at which the auxiliary lever 30 rotated along with the shift lever 10 is brought into contact with the switching lever 40 may be determined by adjusting an installation angle of the auxiliary lever 30, and the position where the shift lever 10 is switched to the manual mode and is brought into contact with the switching lever 40 may be determined by a rotational position in the left and right direction in the D range of the automatic mode. Furthermore, the terminal portions 51 of the substrate 50 may be mounted such that the + position terminal 53, the − position terminal 54, and the P-range terminal 52 are spaced from each other along the rotation radius of the switching lever 40.

Accordingly, since in various aspects of the present invention, shifting is performed in one substrate 50 onto which the shift ranges of the manual mode and the P range are switched, components for the P-range switch are eliminated by integrating P-range switch function into manual switch function, so that the configuration is simplified and cost reduction is achieved.

Figure 7:
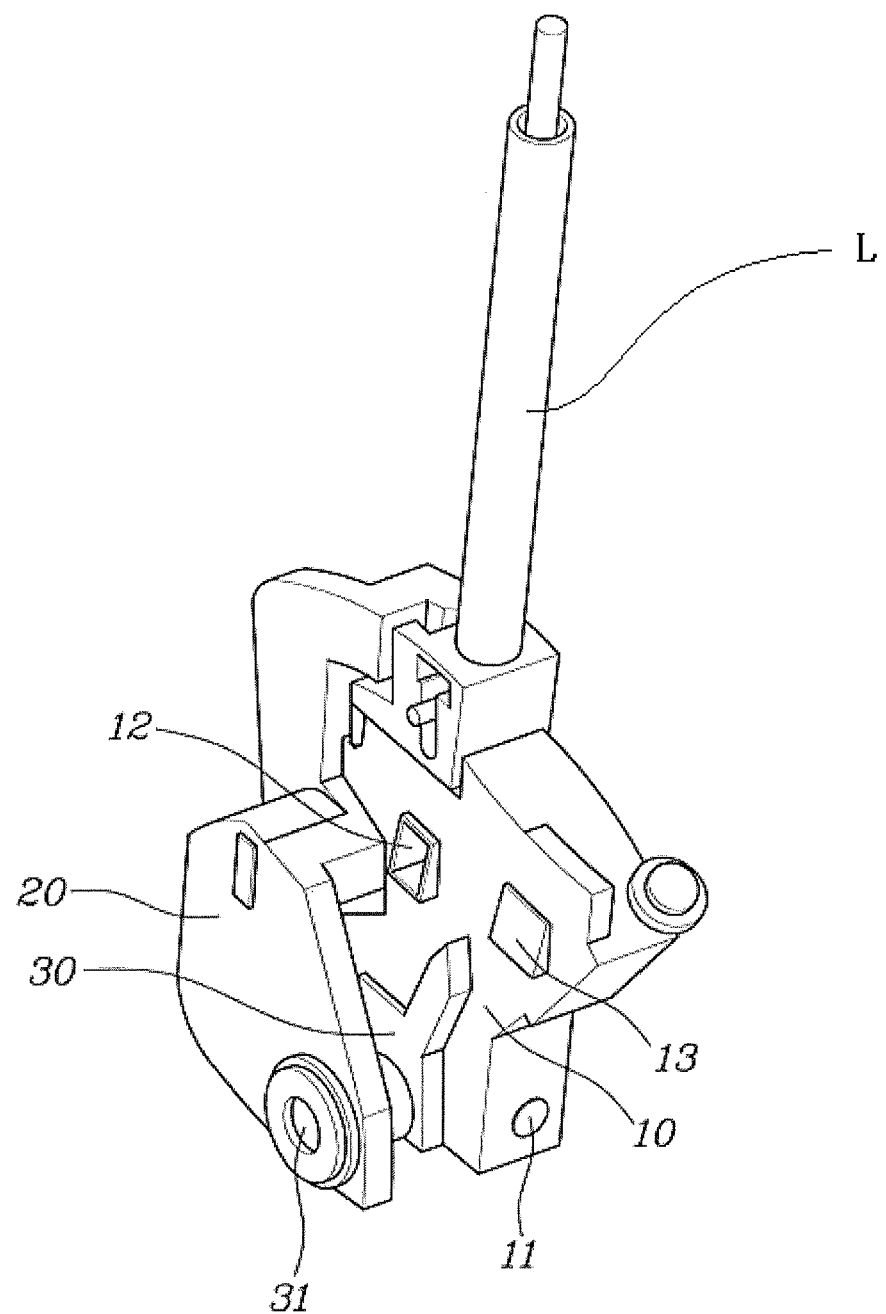

To be specific to the present invention, as shown in FIG. 7, the auxiliary lever 30 may be provided with a rotation shaft 31; the shift lever 10 may be coupled to the rotation shaft 31 through an auxiliary pin 11 penetrating through the rotation shaft 31 to be rotated along with the auxiliary lever 30 in the forward and backward directions or to be rotatable in the left and right direction via the auxiliary pin 11; and the engaging lever 20 may be connected to the shift lever 10 while being provided to be rotatable relative to the rotation shaft 31, and may be configured to be rotated along with the shift lever 10 about the rotation shaft 31 when the shift lever 10 is configured to select the automatic mode, and not to be rotated by being separated from the shift lever 10 when the shift lever 10 is configured to select the manual mode.

In an exemplary embodiment of the present invention, the shift lever 10, the engaging lever 20, and the auxiliary lever 30 may be configured to be a single assembly. As an exemplary embodiment thereof, the auxiliary lever 30 is provided with the rotation shaft 31, and the shift lever 10 is coupled to the rotation shaft 31 through the auxiliary pin 11 penetrating through the rotation shaft 31, whereby the shift lever 10 and the auxiliary lever 30 are rotated together in the forward and backward directions. Furthermore, the shift lever 10 is rotated in the left and right direction at the rotation shaft 31 via the auxiliary pin 11 to be connected to the engaging lever 20 or the switching lever 40, or to be separated from the same. The engaging lever 20 is connected to the shift lever 10 while being provided to be rotatable relative to the rotation shaft 31, and thus is rotated along with the shift lever 10 in the forward and backward directions when the shift lever 10 is rotated in the forward and backward directions. Herein, when the shift lever 10 is rotated in the left and right direction according to selection of the manual mode, the engaging lever is separated from the shift lever 10 and is not rotated. The connecting and separating structure of the shift lever 10 and the engaging lever 20 may be selectively connectable or separated by a protrusion and groove structure applied to a structure of a conventional shift lever.

Meanwhile, the present invention further includes a transmission module casing 60 in which the switching lever 40 is rotatably mounted and the substrate 50 is accommodated. The transmission module casing 60, as shown in FIGS. 1 to 2, may be provided in the bracket core 120 of the lever casing 100, or may be provided at a side of a lever assembly including the shift lever 10, the engaging lever 20, and the auxiliary lever 30 so that the switching lever 40 may be connected to the shift lever 10 when the shift lever 10 is rotated in the left and right direction thereof.

The transmission module casing 60 is provided with a switching mechanism 70 being moved upward and downward when the shift lever 10 is moved in the left and right direction thereof. Furthermore, the terminal portions 51 of the substrate 50 further includes a mode conversion terminal 55 which is electrically connected to the switching mechanism 70 to allow switching to the manual mode when the switching mechanism is moved upward and downward as the shift lever 10 is moved in the left and right direction thereof. Accordingly, through the switching mechanism 70, when the shift lever 10 is rotated in the left and right direction in the D range of the automatic mode to allow switching to the manual mode, the switching mechanism 70 is electrically connected to the mode conversion terminal 55 of the substrate 50, whereby switching to the manual mode is possible.

To be specific, as shown in FIG. 3, the switching lever 40 may be provided with a stop portion 42 which is rotatably provided in the transmission module casing 60 and protrudes toward the shift lever 10 through the transmission module casing 60, and the transmission module casing 60 may be provided with a guide hole 61 receiving a rotation radius of the stop portion 42.

Herein, the switching lever 40 may be rotatably connected to the transmission module casing 60 via a hinge pin 43 and may be provided to be returned to an original position thereof by a return spring 44. The switching lever 40 may be provided with the stop portion 42 protruding toward the shift lever 10 through the guide hole 61 of the transmission module casing 60, and the guide hole 61 of the transmission module casing 60 may extend in a curved shape to receive the rotation radius of the stop portion 42 rotated along with the switching lever 40. As a result, the switching lever 40 may be rotated within a predetermined rotation radius defined in the transmission module casing 60.

Figure 8:
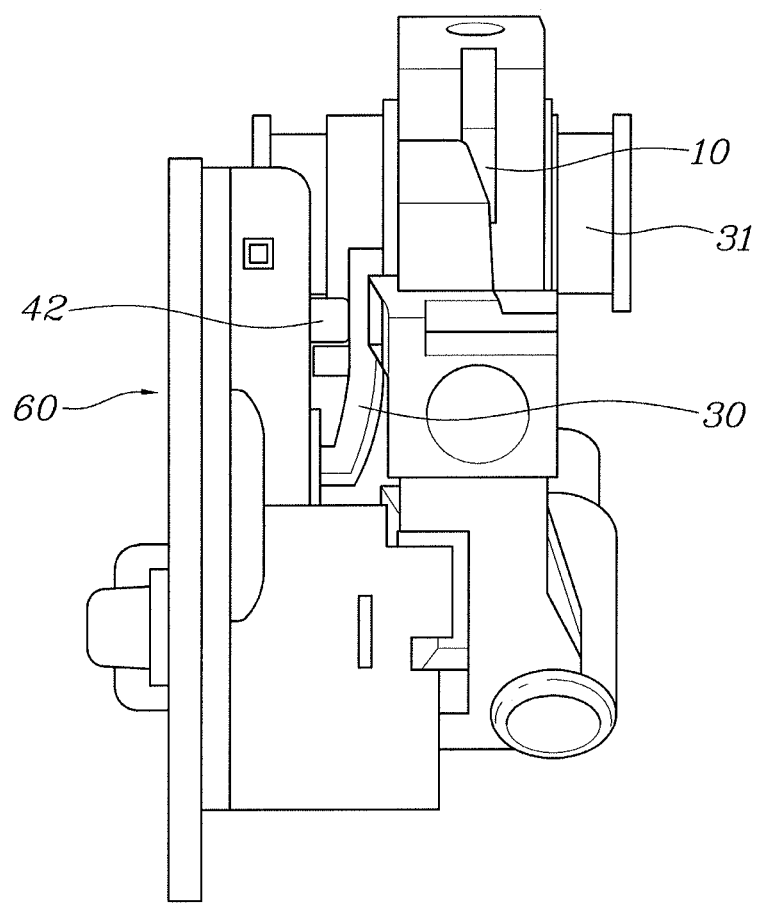
Figure 9:
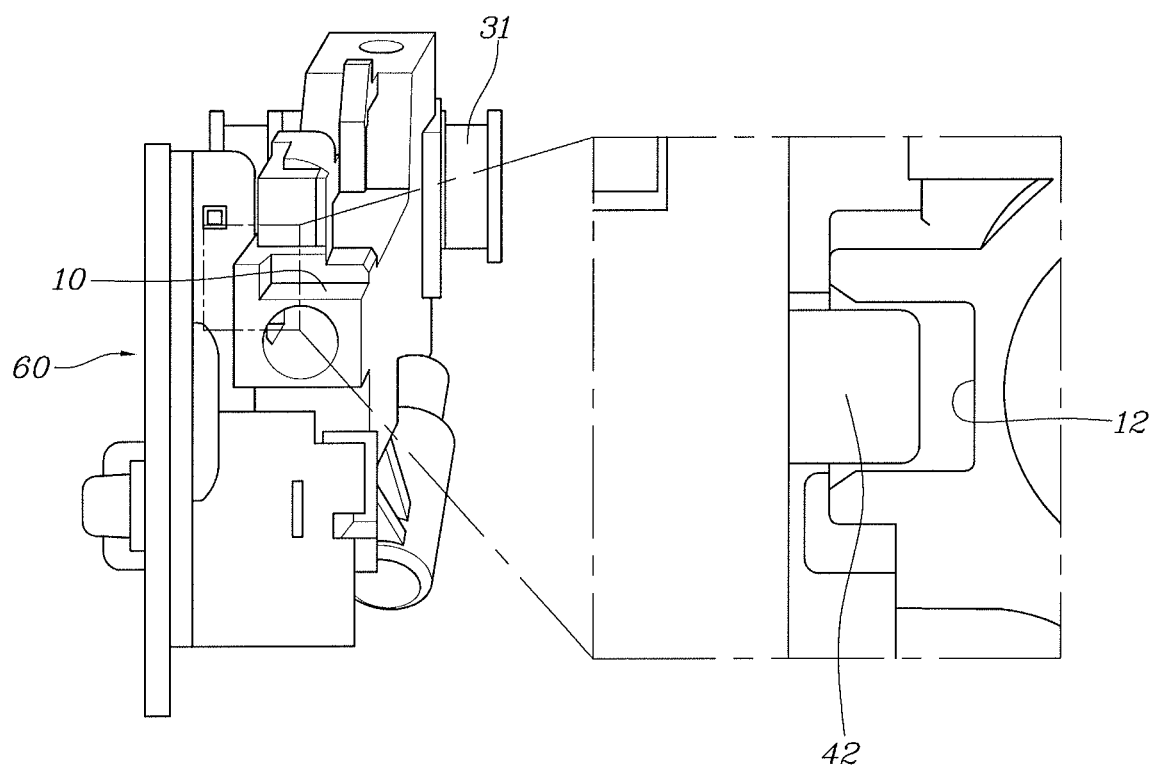

Meanwhile, as shown in FIGS. 8 to 9, the shift lever 10 is formed with a stop groove 12 in a surface thereof facing the transmission module casing 60, so that the stop portion 42 may be inserted into the stop groove 12 when the shift lever 10 is configured to select the manual mode.

In an exemplary embodiment of the present invention, the shift lever 10 and the switching lever 40 are connected together or separated from each other according to the rotational position of the shift lever 10 in the left and right direction thereof. To the present end, the shift lever 10 is formed with a stop groove 12 in a surface thereof facing the transmission module casing 60 to allow the stop portion 42 of the switching lever 40 to be inserted thereinto. Thus, as shown in FIG. 8, when the shift lever 10 is in the automatic mode, the stop portion 42 and the stop groove 12 are separated from each other, and as shown in FIG. 9, when the shift lever 10 is in the manual mode, the stop portion 42 of the switching lever 40 is inserted into the stop groove 12, so that the shift lever 10 and the switching lever 40 are connected to each other and are rotated together.

Meanwhile, as shown in FIG. 3, the switching mechanism 70 may include: a rotating bar 71 rotatably connected to the transmission module casing 60 to perform seesaw movement, and configured such that a first end portion thereof is connected to the shift lever 10 through the transmission module casing 60 and a second end portion thereof is positioned inside the transmission module casing 60; and a movable portion 72 connected to the second of the rotating bar 71, moved linearly in conjunction with rotation of the rotating bar 71, and provided with an electrical connection portion 73 to be electrically connected to the mode conversion terminal 55 when the electrical connection portion 73 enters the mode conversion terminal 55, allowing switching to be performed to the manual mode.

Accordingly, the switching mechanism 70 includes the rotating bar 71 and the movable portion 72, and the movable bar 72 is moved linearly in the upward and downward direction by the rotation of the rotating bar 71 via a hinge pin 75 so that the electrical connection to the terminal portions 51 of the substrate 50 is selectively performed. Herein, the movable portion 72 may be returned to the original position thereof by being supported by an elastic spring 74 provided at the lower side of the switching mechanism.

In other words, the rotating bar 71 is provided in the transmission module casing 60 while having a center point of rotation in the middle thereof, and as the first end portion thereof is connected to the shift lever 10 through the transmission module casing 60, seesaw movement is performed when the shift lever 10 is rotated in the left and right direction thereof. Herein, the first end portion of the rotating bar 71 may be pressed against a protrusion 13 separately formed in the shift lever 10 so that the rotating bar 71 is seesawed when the shift lever 10 is moved in the left and right direction thereof.

The second end portion of the rotating bar 71 is connected to the movable portion 72, and the movable portion 72 is provided with the electrical connection portion 73 electrically connected to the mode conversion terminal 55 of the substrate 50, whereby the electrical connection portion 73 is selectively connectable to the mode conversion terminal 55 according to the rotational position of the rotating bar 71 and switching is performed to the manual mode.

Herein, the transmission module casing 60 may be formed with a slit hole 62 through which the rotating bar 71 penetrates, and a guide portion 63 extending from the slit hole 62 toward the mode conversion terminal 55 to guide the linear movement of the movable portion 72. Accordingly, the rotating bar 71 can protrude toward the shift lever 10 through the slit hole 62 of the transmission module casing 60, and inside the transmission module casing 60, the guide portion 63 is formed by extending from the slit hole 62 toward the mode conversion terminal 55, so that the movable portion 72 may be moved linearly along the guide portion 63.

Accordingly, when the shift lever 10 is configured to select the manual mode by being rotated in the left and right direction thereof, the rotating bar 71 connected to the shift lever 10 is seesawed, and the movable portion 72 connected to the rotating bar 71 is moved linearly along the guide portion 63, whereby the electrical connection portion 73 provided in the movable portion 72 may be electrically connected to the mode conversion terminal 55 of the substrate 50. Accordingly, when the electrical connection portion 73 of the movable portion 72 is electrically connected to the mode conversion terminal 55 of the substrate 50 by being brought into contact with the same, the substrate 50 sends a signal to allow switching to be performed to the manual mode.

Meanwhile, the terminal portions 51 of the substrate 50 may further include a first ground terminal 56 spaced from the mode conversion terminal 55, with the electrical connection portion 73 of the movable portion 72 being always electrically connected to the first ground terminal. Furthermore, the terminal portions 51 of the substrate 50 may further include a second ground terminal 57 in which the P-range terminal 52, the + position terminal 53, and the − position terminal 54 are disposed along the rotation radius of the switching lever 40 while being spaced from each other, with the brush portion 41 of the switching lever 40 being always electrically connected to the second ground terminal. Accordingly, the terminal portions 51 of the substrate 50 includes the first ground terminal 56 electrically connected to the mode conversion terminal 55, and the second ground terminal 57 electrically connected to the P-range terminal 52, the + position terminal 53, and the − position terminal 54, wherein the electrical connection portion 73 remains in contact with the first ground terminal 56, and the brush portion 41 remains in contact with the second ground terminal 57.

Thus, when the electrical connection portion 73 or the brush portion 41 is brought into contact with a predetermined terminal portion 51 provided in the substrate 50, the substrate 50 may electrically send a shift signal according to the corresponding terminal portion 51, and a controller may receive the shift signal to allow shifting to a predetermined shift range to be performed.

The operation of the present invention described above is as follows.

Figure 10:
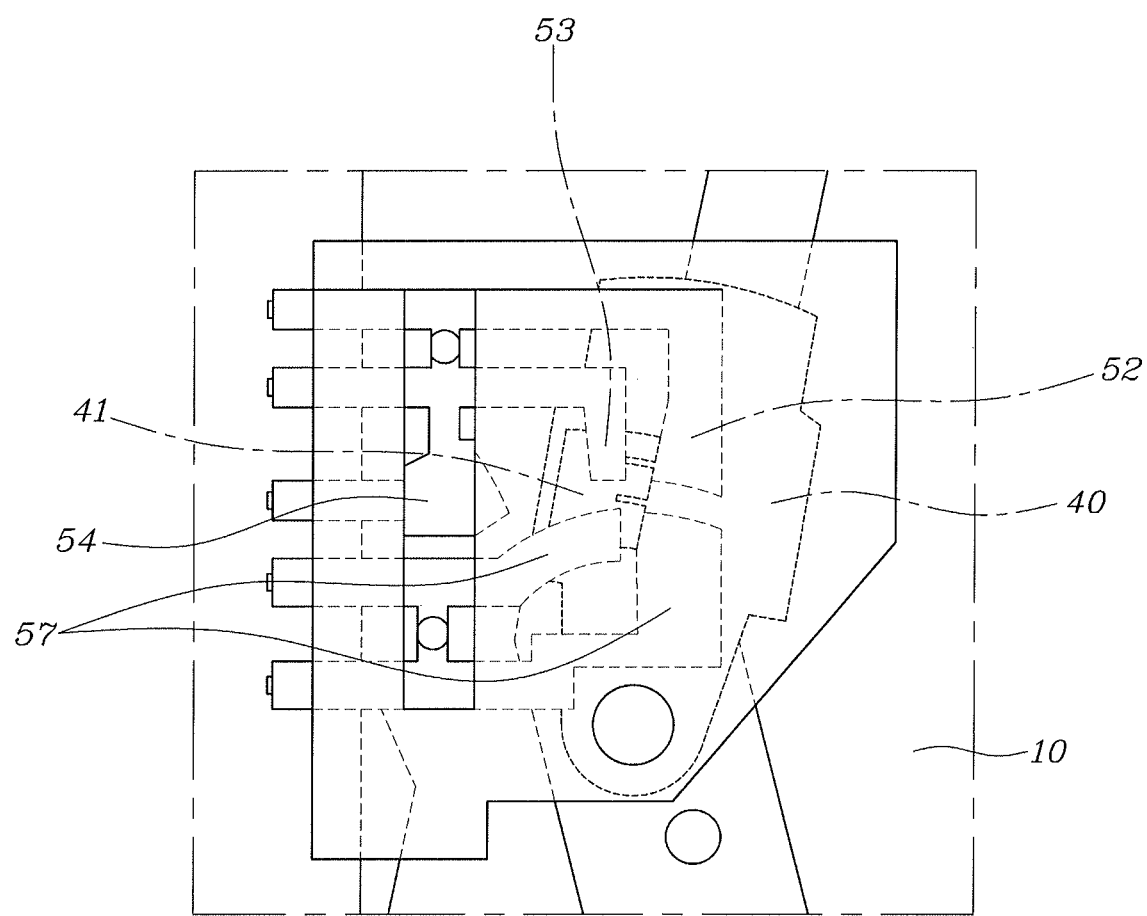

Referring to FIG. 4, when the shift lever 10 performs shifting to the P range in the automatic mode, the auxiliary lever 30 pushes the switching lever 40 to the right. Here, as shown in FIG. 10, as the switching lever 40 is rotated, the brush portion 41 provided in the switching lever 40 is moved to the P-range terminal 52 to be electrically connected thereto, and thus shifting to the P range is performed.

Figure 11:
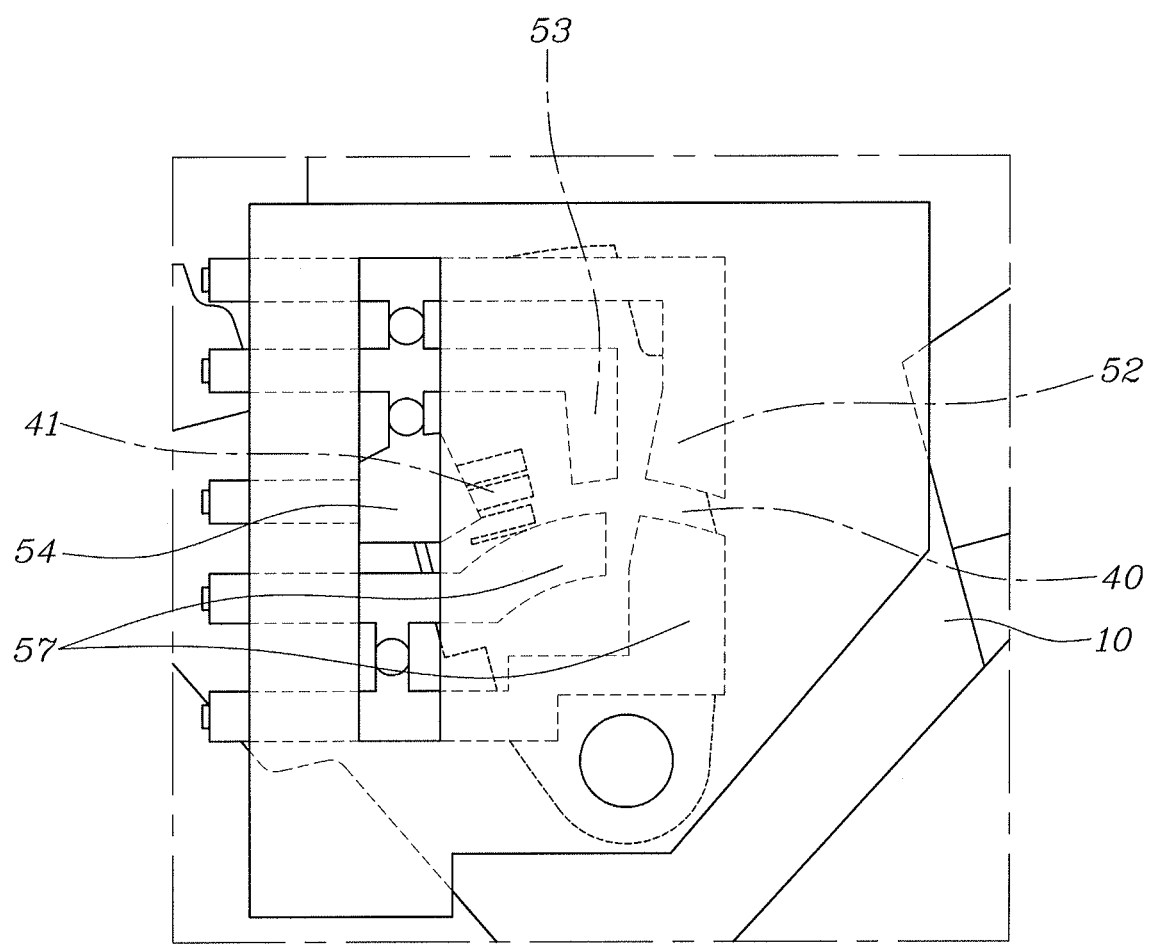

Meanwhile, as shown in FIG. 4, when the shift lever 10 is manipulated to the manual mode, the auxiliary lever 30 is not interfered with by the switching lever 40, and the switching lever 40 is rotated along with the shift lever 10. Here, as shown in FIG. 11, the brush portion 41 provided in the switching lever 40 is positioned between the + position terminal 53 and the − position terminal 54.

Figure 12:
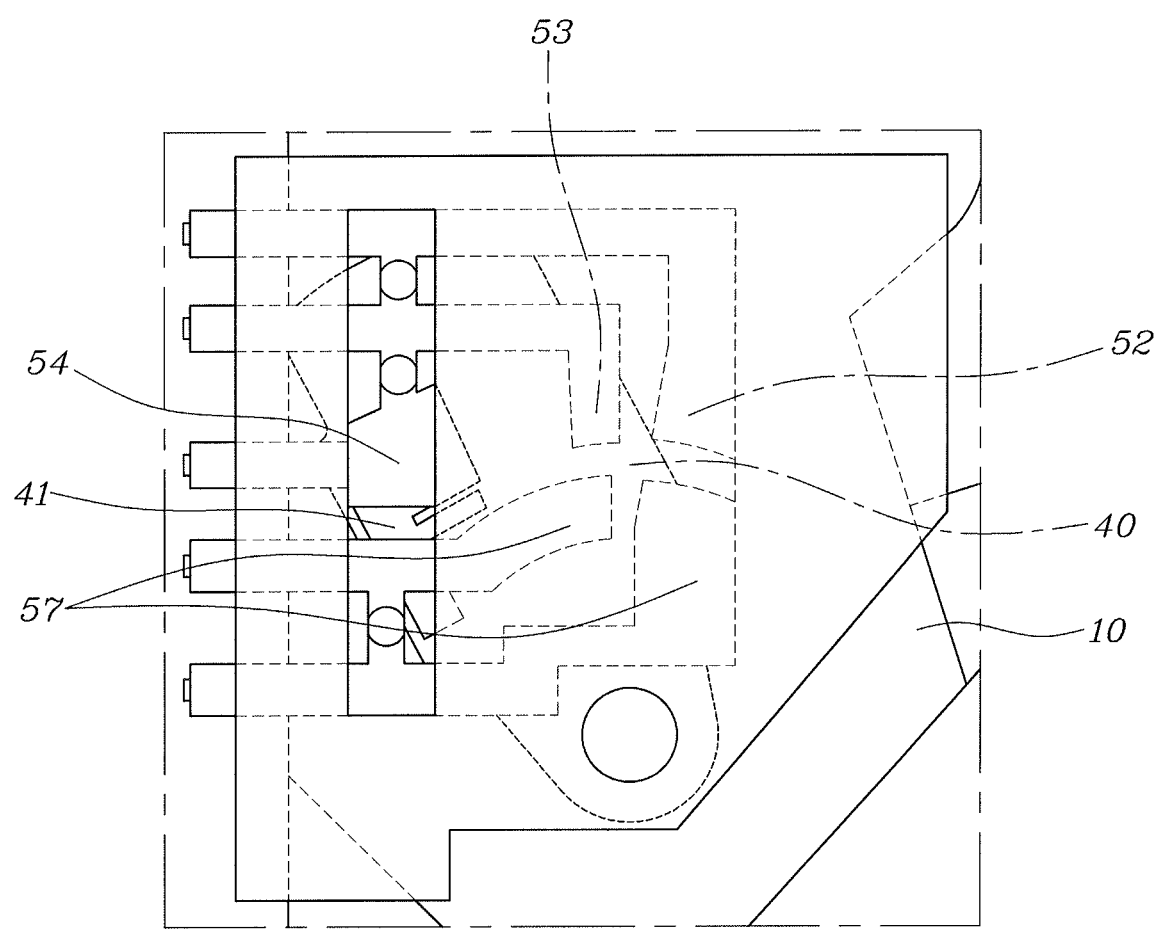

Meanwhile, when the shift lever 10 is manipulated to the + position or the − position in the manual mode, the switching lever 40 is rotated along with the shift lever 10, and the brush portion 41 provided in the switching lever 40 is moved to the + position terminal 53 or the − position terminal 54 and is electrically connected thereto. FIG. 12 shows the state where the brush portion 41 is moved to the − position terminal 54 and is electrically connected thereto.

According to the shift lever apparatus configured for a vehicle configured as described above, since the function of the substrate 50 for manual mode switching is extended and the P-range switch function is integrated, components for the P-range switch are eliminated, so that the configuration is simplified and cost reduction is achieved. Furthermore, as the number of parts of the shift lever module is reduced, the size is reduced, the layout is optimized, and the sliding contact method is applied to reduce the risk of short circuit.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift lever apparatus for a vehicle, the apparatus comprising:
   a shift lever configured to select an automatic mode when being rotated in a first direction and select a manual mode when being rotated in a second direction according to operation of a transmission lever;
   an engaging lever coupled to the shift lever and configured to be moved along with the shift lever when the shift lever is operated to select the automatic mode, and to be separated from the shift lever when the shift lever is operated to select the manual mode;
   an auxiliary lever connected to the shift lever to be moved along with the shift lever in the first direction;
   a switching lever provided within a rotation radius of the auxiliary lever, configured to be moved by the auxiliary lever when the shift lever is operated to select P range of shift ranges of the automatic mode and to be connected to the shift lever and moved along with the shift lever when the shift lever is operated to select the manual mode, and provided with a brush portion; and
   a substrate provided with a plurality of terminal portions having a P-range terminal, a + position terminal, and a − position terminal for the manual mode for detecting a rotational position of the switching lever, and configured to be electrically connected to generate a signal when the switching lever is rotated and the brush portion is positioned at a predetermined terminal portion, allowing a shift range to be switched.

2. The apparatus of claim 1,
wherein the auxiliary lever is provided with a rotation shaft,
wherein the shift lever is coupled to the rotation shaft through an auxiliary pin penetrating through the rotation shaft to be rotated along with the auxiliary lever in the first direction or to be rotatable in the second direction via the auxiliary pin, and
wherein the engaging lever is connected to the shift lever while being provided to be rotatable relative to the rotation shaft, and is configured to be rotated along with the shift lever about the rotation shaft when the shift lever is operated to select the automatic mode, and not to be rotated by being separated from the shift lever when the shift lever is operated to select the manual mode.

3. The apparatus of claim 1, further including:
a transmission module casing in which the switching lever is rotatably mounted, the substrate is accommodated, and a switching mechanism being moved upward and downward when the shift lever is moved in the second direction is provided,
wherein the plurality of terminal portions of the substrate further includes a mode conversion terminal which is electrically connected to the switching mechanism to allow switching to the manual mode when the switching mechanism is moved in a third direction as the shift lever is moved in the second direction.

4. The apparatus of claim 3,
wherein the switching lever is provided with a stop portion which is rotatably provided in the transmission module casing and protrudes toward the shift lever through the transmission module casing, and
wherein the transmission module casing is provided with a guide hole receiving a rotation radius of the stop portion.

5. The apparatus of claim 4, wherein the switching lever is rotatably connected to the transmission module casing via a hinge pin and connected to a return spring.

6. The apparatus of claim 4, wherein the shift lever is formed with a stop groove in a surface thereof facing the transmission module casing such that the stop portion is inserted into the stop groove when the shift lever is operated to select the manual mode.

7. The apparatus of claim 3, wherein the switching mechanism includes:
a rotating bar rotatably connected to the transmission module casing to perform seesaw movement, and configured such that a first end portion of the rotating bar is connected to the shift lever through the transmission module casing and a second end portion of the rotating bar is positioned in the transmission module casing; and
a movable portion coupled to the second end portion of the rotating bar, moved linearly in conjunction with a rotation of the rotating bar, and provided with an electrical connection portion to be electrically connected to the mode conversion terminal when the electrical connection portion enters the mode conversion terminal, allowing a mode conversion of the manual mode.

8. The apparatus of claim 7, wherein the plurality of terminal portions of the substrate further includes a first ground terminal spaced from the mode conversion terminal, and the electrical connection portion of the movable portion being electrically connected to the first ground terminal continuously.

9. The apparatus of claim 7, wherein the transmission module casing includes:
a slit hole through which the rotating bar penetrates; and
a guide portion extending from the slit hole toward the mode conversion terminal to guide linear movement of the movable portion.

10. The apparatus of claim 1, wherein the plurality of terminal portions of the substrate further includes a second ground terminal in which the P-range terminal, the + position terminal, and the − position terminal are disposed along a rotation radius of the switching lever while being spaced from each other, with the brush portion of the switching lever being electrically connected to the second ground terminal continuously.

* * * * *